Figure 4:
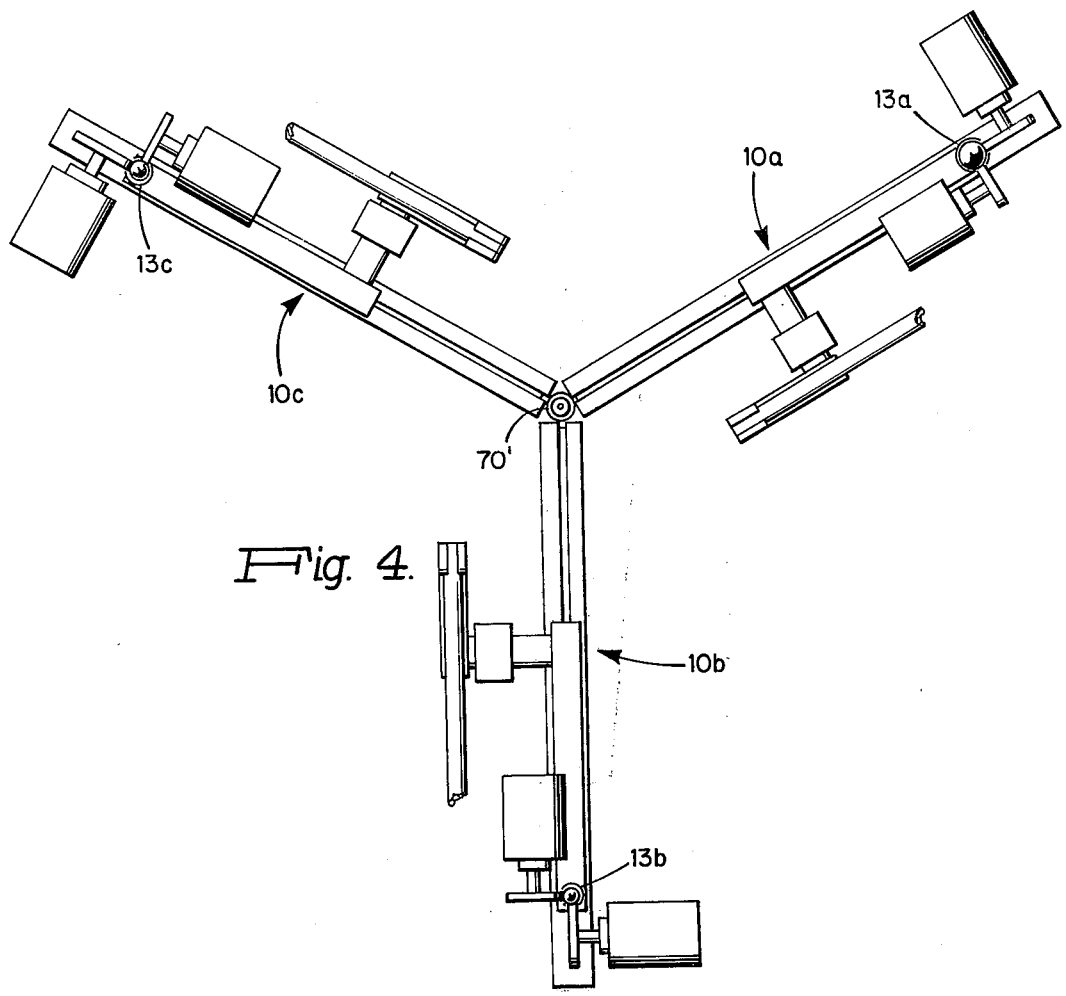

United States Patent [19]
Birk et al.

[11] 3,907,180

[45] Sept. 23, 1975

[54] BEAD ORIENTING APPARATUS

[76] Inventors: John R. Birk, 8 Spruce Ct., Peace Dale, R.I. 02879; Robert B. Kelley, 69 Linden Dr., Kingston, R.I. 02881; David A. Seres, RFD 1, Box 120A, Sauderstown, R.I. 02874

[22] Filed: June 3, 1974

[21] Appl. No.: 475,835

[52] U.S. Cl. .................... 223/48; 29/241; 221/173
[51] Int. Cl. ............................................ A41n 43/00
[58] Field of Search ......... 29/241; 223/48; 221/171, 221/173

[56] References Cited
UNITED STATES PATENTS

| | | | |
|---|---|---|---|
| 2,640,631 | 6/1953 | Litterio et al. | 223/48 |
| 2,670,109 | 2/1954 | Perry et al. | 223/48 |
| 3,004,690 | 10/1961 | Spool | 223/48 |

*Primary Examiner*—James L. Jones, Jr.
*Attorney, Agent, or Firm*—Thompson, Birch, Gauthier & Samuels

[57] ABSTRACT

An apparatus is disclosed for orienting beads and other like bodies of the type which have at least one hole therein. In the preferred embodiment herein disclosed, the apparatus is employed for orienting beads in preparation for stringing, and includes a vertical guide tube for receiving the beads and for guiding the same downwardly along a path to one end of the tube. An orienting pin is located at the lower end of the guide tube. Wheels rotating at different speeds about non-parallel axes, frictionally engage and impart motion to each bead as it arrives at the lower end of the guide tube to align the hole in the bead with the guide pin, thereby allowing the bead to be inserted onto the guide pin. The orienting pin is rotatable about an intermediate axis to a second position in alignment with a receiving pin onto which the oriented beads are transferred for stringing. A track arcuately surrounds the intermediate axis and serves to retain the beads on the orienting pin during its rotation to the second position. The receiving pin may serve as the threading needle for threading the oriented beads onto a chain, string or the like.

11 Claims, 5 Drawing Figures

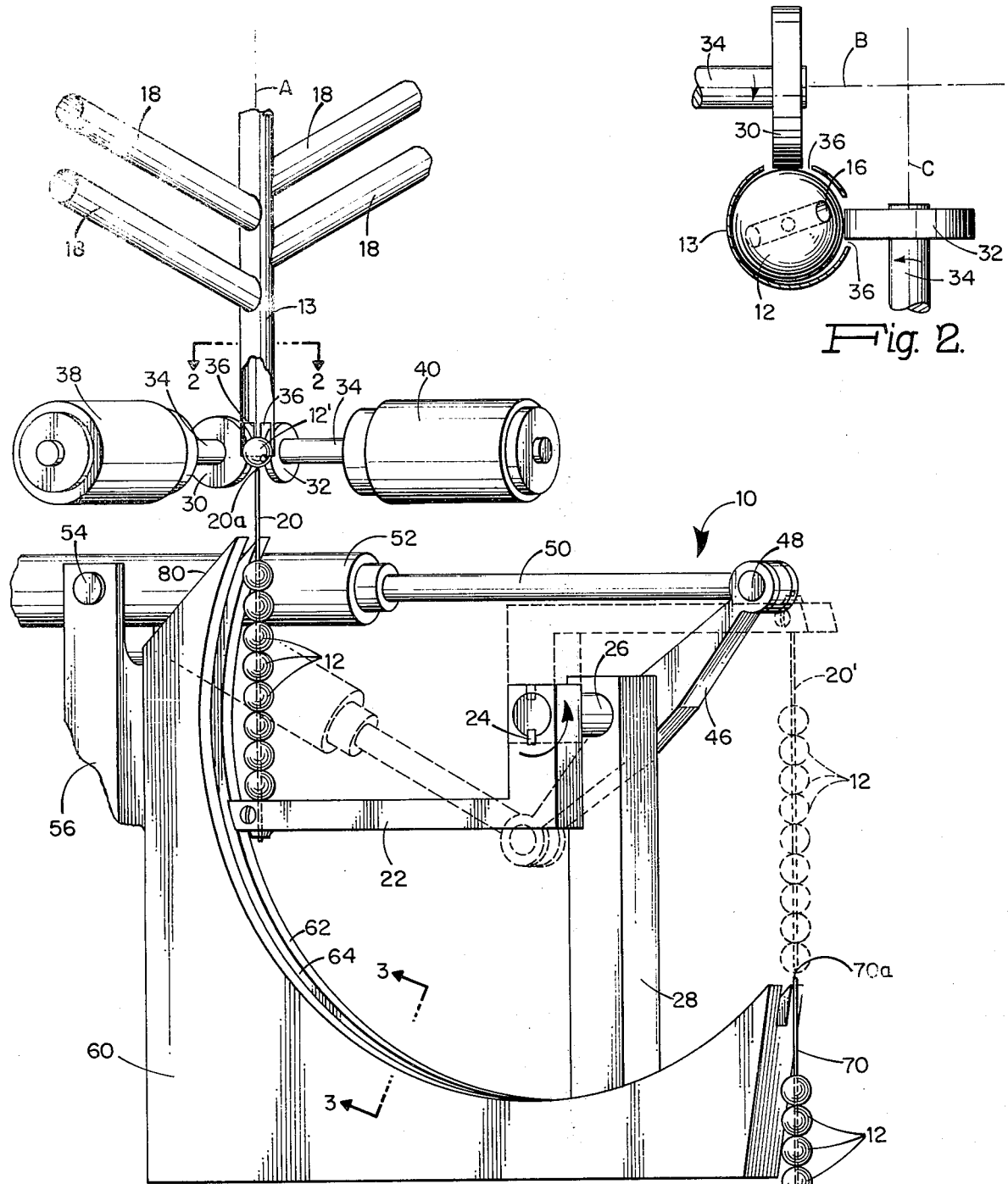
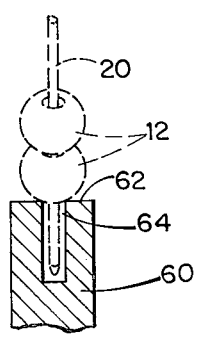
Fig. 1.
Fig. 2.
Fig. 3.

BEAD ORIENTING APPARATUS

DESCRIPTION OF THE INVENTION

This invention relates generally to the art of bead orientation in the making of jewelry, and is concerned in particular with a novel and improved apparatus for orienting, transferring and stringing bodies such as beads and the like which have holes therein. The invention is particularly suited for, although not limited in use to, the handling of spherical bodies having holes extending centrally therethrough.

Conventionally, beads are oriented and strung by manually employing a needle and thread. This operation is both time consuming and inefficient, and requires a large number of personnel. Numerous attempts have been made to automate this operation, but to date none have been successful, and accordingly manual orientation and stringing is still the dominant method employed.

Accordingly, a primary object of the present invention is to provide a novel and improved apparatus for orienting bodies having at least one hole therein. Where the holes extend completely through the bodies, the apparatus may be employed to thread the same onto an orienting pin. Orientation is accomplished rapidly, positively, without manual handling, and in a manner which is readily adaptable to automated controls. A further object of the present invention is the provision of means for rapidly and positively transferring oriented bodies from one pin to another, again without manual handling, and with positive ejection of imperfect spherical bodies.

Figure 5:
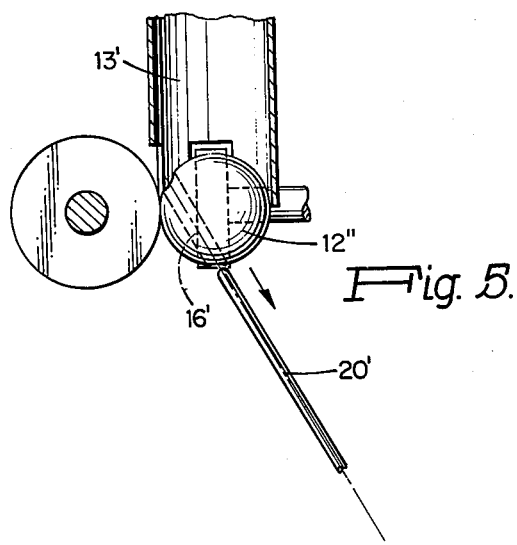

These and other objects and advantages will become more apparent as the description proceeds with the aid of the accompanying drawings, wherein:

FIG. 1 is a perspective view of a bead stringing apparatus in accordance with the present invention;

FIGS. 2 and 3 are sectional views on an enlarged scale taken along lines 2—2 and 3—3 of FIG. 1;

FIG. 4 is a somewhat schematic plan view of an alternate embodiment of the invention; and, FIG. 5 is a partial sectional view showing still another alternate embodiment of the invention.

Referring now to FIGS. 1–3, a bead stringing apparatus in accordance with the present invention is generally indicated at 10. The apparatus includes guide means in the form of a vertical tube 13 suitably sized to accommodate movement therethrough of bodies, typically spherical beads 12, each having at least one hole 16 extending centrally therethrough.

Any feed means may be provided for feeding beads into the tube 13. Typically, such feed means may include a plurality of tubes 18 leading from storage bins containing beads of the same size but of different colors. The sequence of feeding the different colored beads may be controlled automatically by means of a computer (not shown).

An elongated orienting pin 20 is mounted on the end of a support arm 22, the latter being keyed as at 24 or otherwise attached to a shaft 26 which is journalled for rotation about an intermediate axis in the upper end of a support standard or post 28. An operating means is provided for rotating the shaft 26 so as to move the orienting pin between an upstanding first orienting position as indicated by the solid lines in FIG. 1, and a second inverted delivery position as indicated at 20' by the dotted lines in the same view. When the orienting pin 20 is in the first orienting position, its axis is coaxial with the path or axis A defined by the tube 13, and the upper end 20a of the pin is positioned slightly below the lower end of the tube 13. The beads which are fed into the tube 13 will drop under the influence of gravity onto the upper end 20a of the pin 20. The gravitational effect may if desired be augmented by other means, for example a downwardly directed air jet. If the central hole 16 in the bead should happen to be in axial alignment with the pin 20, it will continue to drop and become axially inserted and oriented thereon. This is an ideal condition which will occur infrequently. More likely than not, the hole 16 in the bead will not be in axial alignment with pin 20, and as a result the bead will be temporarily supported as at 12' on the upper end 20a of the pin.

Means are provided for imparting motion to the thus supported bead 12' in order to align its hole 16 with the pin 20. In the preferred embodiment herein illustrated, the said means includes a pair of friction wheels 30, 32 mounted on shafts 34 for rotation about orthogonal axes B and C. The wheels 30, 32 protrude through slots 36 in the lower end of the tube 13 and frictionally engage the bead 12' which is temporarily at rest on the upper end 20a of pin 20. The peripheries of the wheels 30, 32 are arranged to run at different speeds. Preferably, this is accomplished through the use of a pair of variable speed motors 38, 40, the output shafts of which either comprise or are connected to the shafts 34. Also preferably, the direction of rotation of the shafts 34 is as indicated diagrammatically in FIG. 2 in order to impart a downward force component to the bead 12'.

With this arrangement, the bead 12' will be caused to rotate about the two orthogonal axes B and C at different rates. The movement thus imparted to the bead will ultimately locate the hole 16 of the bead in general alignment with pin 20, thereby permitting the bead to drop onto the pin. Because the movement imparted to the bead and hence the travel of the hole is under positive control, the peripheral speed of the wheels 30, 32 can be selected to achieve efficient orientation.

After a predetermined number of beads has been properly oriented and inserted on the pin 20, the feeding of additional beads into the alignment tube 13 is temporarily interrupted, and the pin 20 is shifted from the first orienting position to the second delivery position 20'. As previously indicated, this is accomplished by rotating arm 22 about the axis of shaft 26. This rotation can be accomplished by any known means, for example by employing a crank arm 46 pivotally connected as at 48 to the piston rod 50 of a double-acting pneumatic cylinder 52, which is in turn pivotally mounted as at 54 to a fixed support 56.

A retainer 60 is employed to retain the beads on the pin 20 during movement thereof between the first and second positions. The retainer comprises a track 62 extending arcuately around the rotational axis of shaft 26 between the first and second positions. The track is grooved as at 64 to accommodate the upper end of the pin 20.

A vertical receiving pin 70 is located at the second position. The receiving pin may be supported by any convenient means, for example a rotatably table 72 on which a plurality of other like receiving pins (not shown) are carried. The upper pin end 70a is positioned directly adjacent to the position of the inverted end 20a of orienting pin 20 when the latter arrives at the second position.

When the orienting pin 20 arrives at the second position, the last bead deposited thereon moves clear of the track 62, and the oriented beads are thus free to drop axially from pin 20 onto pin 70. Once this transfer has taken place, the pin 20 is returned to the first position where orientation of the next group of beads is commenced. The oriented beads on the loaded receiving pin may then be transferred to a string, chain or the like.

Experience has indicated that mass-produced beads have a certain percentage which are imperfect due to the fact that their holes 16 are either partially blocked or do not extend completely therethrough. Since such imperfect beads will be prevented from inserting themselves on the orienting pin 20, they must be ejected. To this end, an inclined ramp 80 is provided at the end of the arcuate track 62 adjacent to the first position. In the event that an imperfect bead is encountered, the arm 22 is partially rotated to bring the imperfect bead into engagement with the ramp, thereby stripping the imperfect bead off of the upper end of the pin 20. The pin 20 is then returned to its vertical position and bead orientation is continued.

Referring now to FIG. 4, an alternate embodiment of the invention is shown comprising a plurality of orienting and transfer devices 10a, 10b and 10c arranged radially in relation to a central receiving pin 70'. The guide tubes 13a, 13b, 13c of the aforesaid devices are provided with different diameters in order to handle different-sized beads. With this arrangement, operation of the devices 10a–10c can be automated and programmed to produce necklaces and the like which include both different colored and different sized beads.

FIG. 5 shows another embodiment of the invention wherein the lower end of the guide tube 13' terminates at an angle, and wherein the orienting pin 20' is inclined at an angle relative to the axis of the tube. This embodiment is particularly suited for handling beads or other like bodies of the type indicated at 12", having holes 16' which do not extend centrally therethrough.

It will be further understood that the present invention may also be employed to orient beads having holes which do not extend completely therethrough. Such beads are conventionally manually mounted on the pin-like projections of earrings, brooches. etc. Under these circumstances, rather than employing an orienting pin 20, retainer 60 and transfer pin 70, a plurality of earrings or brooches would be placed on a rotatable table or other like support, and their pin-like projections would be successively positioned at the bottom of the guide tube 13, at which position each would receive a bead inserted thereon as a result of the motion imparted to the bead by the wheels 30, 32.

In the light of the foregoing description, it will now be evident to those skilled in the art that further modifications may be made without departing from the spirit and scope of the invention. Among such modifications might be the use of air jets or vibrating means in place of the wheels 30, 32 to impart motion to the beads at the lower end of the tube 13. The tubes 13 need not be vertically arranged, and the bodies being oriented and transferred need not be spherical.

The advantages of the present invention will now be readily appreciated by those skilled in the art. These advantages include rapid and positive orientation of holes in bodies such as spherical beads and the like, rapid and positive transfer of hole-oriented objects from one pin to another, and positive ejection of imperfect objects with incomplete holes.

It is our intention to cover all changes and modifications to the embodiment herein chosen for purposes of disclosure which do not depart from the spirit and scope of the invention.

We claim:

1. Apparatus for orienting bodies of the type which have at least one hole therein, said apparatus comprising: guide means for receiving the bodies and for guiding the same along a path to one end of said guide means; orienting pin means at the said one end of said guide means, said orienting pin means being positioned to contact a body at the said one end of said guide means; and means for imparting motion to a body located at the said one end of said guide means, the said means including a pair of wheels rotatable about nonparallel axes, the peripheries of said wheels being positioned to contact the surface of a body located at the said one end of said guide means, the aforesaid motion being operative to locate the hole of the body relative to said orienting pin means to thereby allow the body to be inserted on said orienting pin means.

2. The apparatus as claimed in claim 1 wherein said path and said orienting pin means are arranged vertically and coaxially during the transfer of bodies from said guide means onto said orienting pin means.

3. The apparatus as claimed in claim 1 further characterized by means for causing the peripheries of said wheels to rotate at different speeds.

4. The apparatus as claimed in claim 1 further characterized by receiving pin means positioned remotely from said guide means; and transfer means for moving said orienting pin means between a first position adjacent to said guide means and a second position in alignment with said receiving pin means, at which second position bodies inserted on said orienting pin means will be transferrable therefrom onto said receiving pin means.

5. The apparatus as claimed in claim 4 wherein the axis of said guide means and the axis of said receiving pin means are vertical and parallel and wherein said orienting pin means is mounted on an arm which is rotatable about an intermediate axis when moving said orienting pin means between said first and second position.

6. The apparatus as claimed in claim 5 further characterized by retaining means for retaining bodies on said orienting pin means during the movement thereof from said first position to said second position.

7. The apparatus as claimed in claim 6 wherein said retaining means is comprised of track means extending arcuately around said intermediate axis from said first position to said second position, said track means having a groove extending along the length thereof for receiving the upper end of said orienting pin means.

8. The apparatus as claimed in claim 7 further characterized by ejection means responsive to movement of said orienting pin means from said first position towards said second position for removing imperfect bodies which are not fully received on said orienting pin means.

9. The apparatus as claimed in claim 8 wherein said ejection means is comprised of a ramp on said retaining means at said first position, said ramp being inclined downwardly away from said track means, the upper end of said ramp being positioned to engage and deflect imperfect bodies during movement of said orienting pin means from said first position towards said second position.

10. Apparatus for orienting different-sized bodies of the type which have at least one hole extending therethrough, and for inserting the thus oriented bodies onto an enlongated receiving means, comprising: a plurality of guide means for receiving said bodies and for guiding the same along paths to one end of the guide means, each said guide means being suitably dimensioned to accommodate a given sized body; orienting pin means associated with each said guide means; transfer means for moving said orienting pin means between first positions at which the orienting pin means are arranged to engage bodies at the said one ends of said guide means, and a common second position in alignment with said receiving means; and, means for imparting motion to bodies located at the said one ends of said guide means, the aforesaid motion being operative to locate the holes of said bodies relative to said orienting pin means to thereby permit the bodies to be inserted onto said orienting pin means, whereby subsequent movement of said orienting pin means to said second position will result in said bodies being transferred from said orienting pin means onto said receiving means.

11. Apparatus for orienting and stringing beads and other like bodies which have a generally spherical shape with at least one hole extending therethrough, said apparatus comprising: a tube having a lowermost end; an orienting pin having an uppermost end located proximate to the lowermost end of said tube; means for introducing bodies into said tube, said bodies being guided by said tube to the lowermost end thereof; and means including at least two wheels rotating about non-parallel axes with their peripheries positioned to contact and impart motion to a body at the lowermost end of said tube, the said motion being operative to align a hole in each body at the lowermost end of said tube with said orienting pin, thereby allowing the body to become inserted on said pin.

* * * * *